(12) United States Patent
Kraev et al.

(10) Patent No.: US 9,966,107 B1
(45) Date of Patent: May 8, 2018

(54) NETWORKED MEDIA CONSUMPTION SERVICE

(75) Inventors: Kaloyan K. Kraev, Seattle, WA (US); Calvin D. Freitas, Seattle, WA (US); Steven A. Miles, Seattle, WA (US); David J. Anderson, Seattle, WA (US); John Santino, Bellevue, WA (US); Kurtis J. Norwood, Seattle, WA (US); Sukhada S. Palkar, Renton, WA (US); Naveenkumar Selvaraj, Minneapolis, MN (US); Olivier Z. Garamfalvi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1229 days.

(21) Appl. No.: 13/247,390

(22) Filed: Sep. 28, 2011

(51) Int. Cl.
*G11B 27/00* (2006.01)

(52) U.S. Cl.
CPC .................................. *G11B 27/00* (2013.01)

(58) Field of Classification Search
None
See application file for complete search history.

(56) References Cited

U.S. PATENT DOCUMENTS

| | | | |
|---|---|---|---|
| 6,192,340 B1 | 2/2001 | Abecassis | |
| 6,496,802 B1 * | 12/2002 | van Zoest et al. | 705/14.73 |
| 6,600,898 B1 * | 7/2003 | De Bonet et al. | 455/3.04 |
| 6,973,476 B1 * | 12/2005 | Naden et al. | 709/203 |
| 6,983,371 B1 | 1/2006 | Hurtado et al. | |
| 7,822,687 B2 | 10/2010 | Brillon et al. | |
| 8,059,646 B2 * | 11/2011 | Svendsen et al. | 370/390 |
| 8,315,950 B2 | 12/2012 | Conley et al. | |
| 8,332,887 B2 | 12/2012 | Dion et al. | |
| 8,413,189 B1 | 4/2013 | Parekh et al. | |
| 2003/0050058 A1 * | 3/2003 | Walsh et al. | 455/426 |
| 2005/0044411 A1 | 2/2005 | Somin et al. | |
| 2005/0119936 A1 | 6/2005 | Buchanan et al. | |
| 2006/0195521 A1 * | 8/2006 | New et al. | 709/204 |

(Continued)

OTHER PUBLICATIONS

Home [Screen capture from archive.org taken at Jun. 9, 2000; accessed on Feb. 11, 2013], cablemusic.com, Inc, http://web.archive.org/web/20000609024318/http://www.cablemusic.com/.*

(Continued)

*Primary Examiner* — Jason G Liao
(74) *Attorney, Agent, or Firm* — Thomas Horstemeyer, LLP

(57) ABSTRACT

Disclosed are various embodiments for transmitting a plurality of files of a plurality of file systems associated with a corresponding plurality of users to each one of the users. In one embodiment, a jukebox service identifies files from file systems associated with each user requesting to consume the transmitted content. In one embodiment, the jukebox service identifies the files based in part on a plurality of disc jockey preferences provided by a disc jockey. The jukebox service then generates a jukebox playlist of the identified files having an order that is generated based at least in part on a playback profile associated with each one of the files. For instance, the playback profile may describe a playback frequency of the respective file. The jukebox service may then transmit the files over a network to clients of requesting users according to the order established by the jukebox playlist.

25 Claims, 8 Drawing Sheets

(56) References Cited

U.S. PATENT DOCUMENTS

| | | | |
|---|---|---|---|
| 2008/0046922 A1* | 2/2008 | Jankins et al. | 725/35 |
| 2008/0288365 A1 | 11/2008 | Fisher et al. | |
| 2008/0313716 A1 | 12/2008 | Park | |
| 2009/0006375 A1 | 1/2009 | Lax et al. | |
| 2009/0144273 A1 | 6/2009 | Kappos | |
| 2009/0164902 A1 | 6/2009 | Cohen et al. | |
| 2009/0271309 A1 | 10/2009 | Gordon et al. | |
| 2009/0327035 A1 | 12/2009 | Allard | |
| 2011/0313874 A1 | 12/2011 | Hardie et al. | |

OTHER PUBLICATIONS

Monroe, xkcd: Password Strength date unknown [Accessed on Feb. 11, 2013], xkcd, http://xkcd.com/936/.*

*Theme*Time* date unknown [per: http://www.notdarkyet.org/tt-cats.html, at least Jan. 2009], notdarkyet.org, http://www.notdarkyet.org/themetime.html, http://www.notdarkyet.org/tt-cats.html.*

Harrison, CDIA Training & Test Preparation Guide 2000, Specialized Solutions Inc., pp. 188-189.*

U.S. Appl. No. 13/247,386, filed Sep. 28, 2011, Final Office Action dated Feb. 12, 2015.

U.S. Appl. No. 13/247,386, filed Sep. 28, 2011, Response to Non-Final Office Action dated Oct. 28, 2014.

U.S. Appl. No. 13/247,386, filed Sep. 28, 2011, Response to Final Office Action dated May 5, 2014.

U.S. Appl. No. 13/247,386, filed Sep. 28, 2011, Final Office Action dated May 5, 2014.

U.S. Appl. No. 13/247,386, filed Sep. 28, 2011, Response to Non-Final Office Action dated Dec. 16, 2013.

U.S. Appl. No. 13/247,386, filed Sep. 28, 2011, Non-Final Office Action dated Dec. 16, 2013.

U.S. Appl. No. 13/247,386, filed Sep. 28, 2011, Response to Final Office Action dated Jun. 27, 2013.

U.S. Appl. No. 13/247,386, filed Sep. 28, 2011, Final Office Action dated Jun. 27, 2013.

U.S. Appl. No. 13/247,386, filed Sep. 28, 2011, Response to Non-Final Office Action dated Feb. 15, 2013.

U.S. Appl. No. 13/276,897, filed Oct. 19, 2011, Response to Final Office Action dated Apr. 15, 2016.

U.S. Appl. No. 13/276,897, filed Oct. 19, 2011, Response to Non-Final Office Action dated Oct. 6, 2015.

U.S. Appl. No. 13/276,897, filed Oct. 19, 2011, Response to Final Office Action dated Feb. 13, 2013.

U.S. Appl. No. 13/276,897, filed Oct. 19, 2011, Response to Non-Final Office Action dated Nov. 6, 2012.

U.S. Appl. No. 13/276,897, filed Oct. 19, 2011, Non-Final Office Action dated May 30, 2017.

Non-Final Office Action dated Nov. 6, 2012; U.S. Appl. No. 13/276,897.

Final Office Action dated Feb. 13, 2013; U.S. Appl. No. 13/276,897.

Non-Final Office Action dated Oct. 6, 2015; U.S. Appl. No. 13/276,897.

Final Office Action dated Apr. 15, 2016; U.S. Appl. No. 13/276,897.

Non-Final Office Action dated Oct. 28, 2014; U.S. Appl. No. 13/247,386.

Final Office Action dated Feb. 15, 2015; U.S. Appl. No. 13/247,386.

* cited by examiner

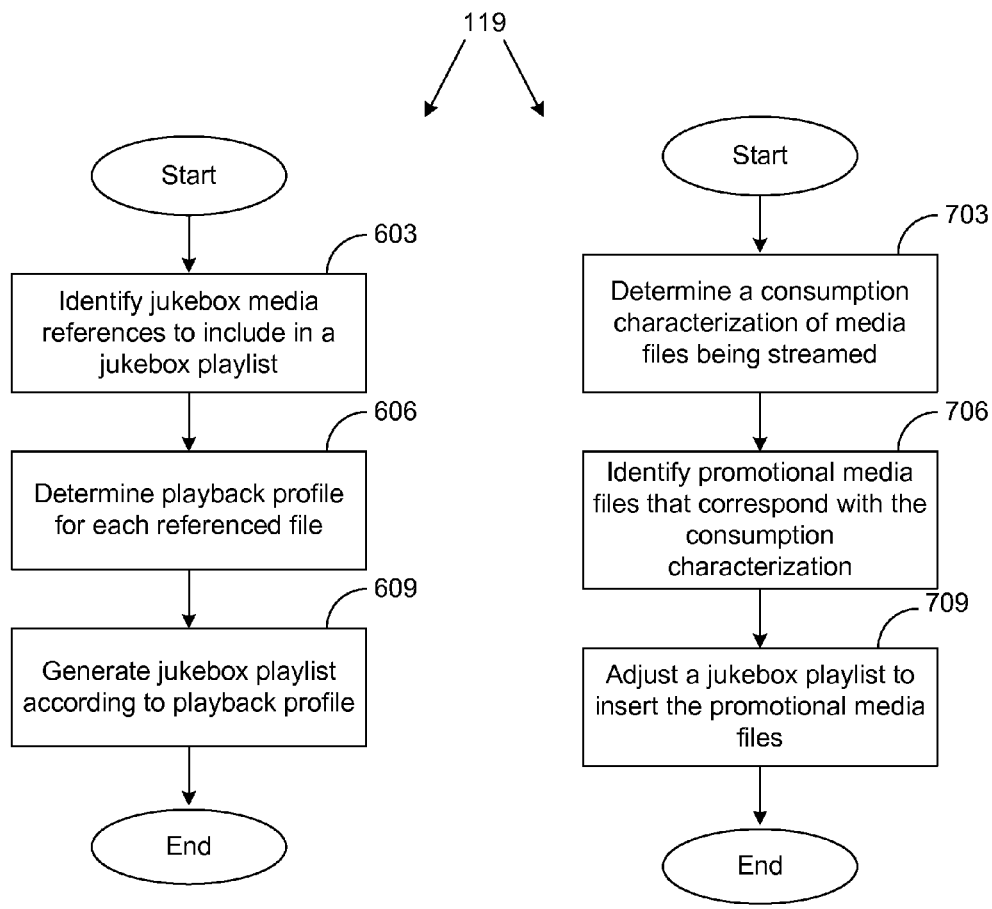
FIG. 6  FIG. 7

NETWORKED MEDIA CONSUMPTION SERVICE

BACKGROUND

Users may store a variety of files on a hard drive of a personal computer, such as, documents, audio files, and video files. Each of the users may then access their respective hard drives for consuming the files. For example, the user may access the hard drive of the personal computer to view the document, listen to the audio file, and watch the video file.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 6 and 7 are flowcharts illustrating one example of functionality implemented as portions of a jukebox service executed in a computing device in the networked environment of FIG. 1 according to various embodiments of the present disclosure.

DETAILED DESCRIPTION

The present disclosure relates to transmitting a plurality of files of a plurality of file systems associated with a corresponding plurality of users to each one of the users. In one embodiment, a jukebox service is executed to identify a plurality of files from the file systems associated with each user requesting to consume streamed or otherwise transmitted content. In one embodiment, the jukebox service identifies the files based in part on a plurality of disc jockey preferences provided by a disc jockey. The jukebox service then generates a jukebox playlist of the identified files having an order that is generated based at least upon a playback profile associated with each one of the files. For instance, the playback profile may describe a playback frequency of the respective file. The jukebox service may then transmit the files over a network to clients of requesting users according to the order established by the jukebox playlist. In the following discussion, a general description of the system and its components is provided, followed by a discussion of the operation of the same.

Figure 1:
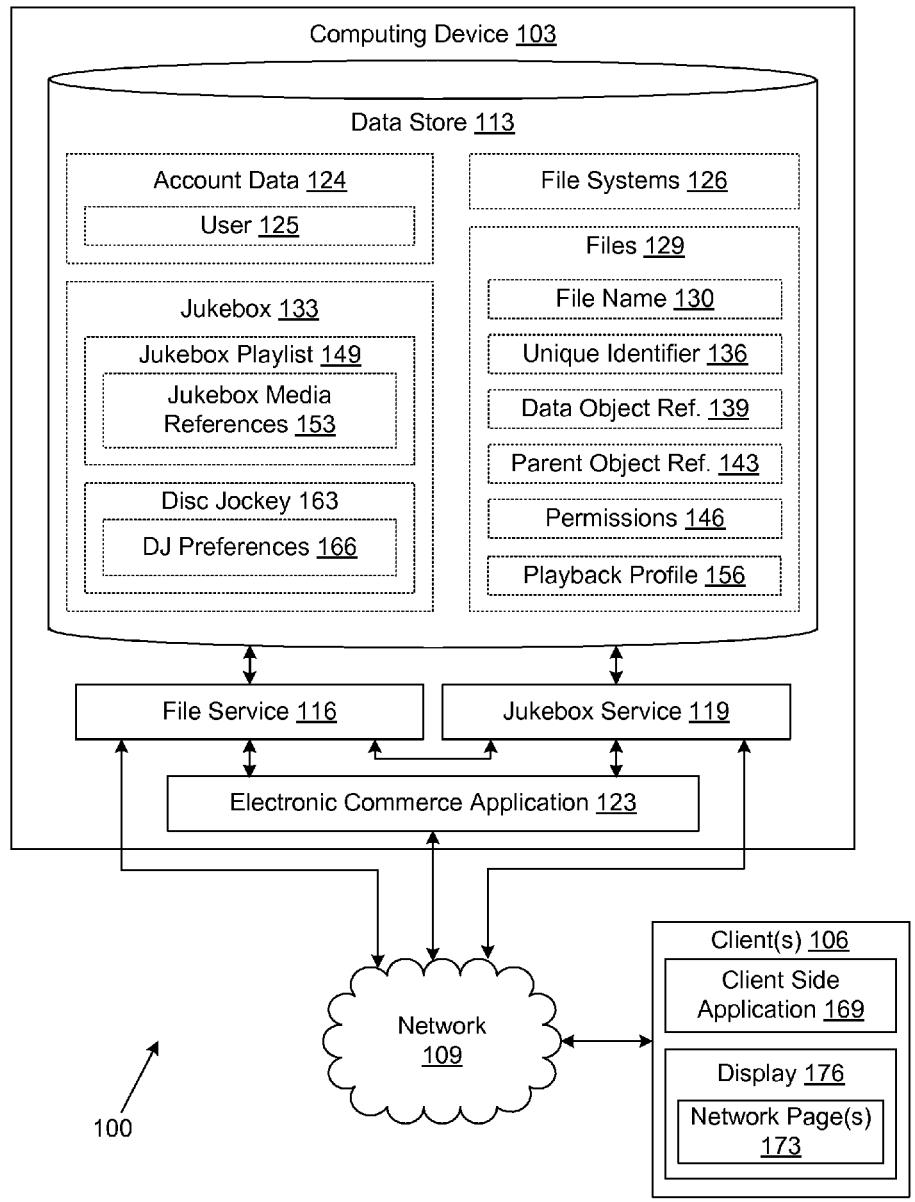
FIG. 1 is a drawing of networked environment according to various embodiments of the present disclosure.

With reference to FIG. 1, shown is a networked environment 100 according to various embodiments. The networked environment 100 includes a computing device 103, a client device 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include a file service 116, a jukebox service 119, an electronic commerce system 123, and other applications, services, processes, systems, engines, or functionality not discussed in detail herein. The file service 116 is executed to maintain an organization of files and folders in file systems associated with service accounts. To this end, the file service 116 may support various file-related operations such as, for example, creating files, deleting files, modifying files, setting permissions for files, downloading data files, and/or other operations. The jukebox service 119 is executed to facilitate the transmitting or transmitting of media to a consuming audience at the direction of a disc jockey. To this end, the jukebox service 119 may support various media-related operations such as, for example, identifying media files, determining a media file playback profile, and generating a playlist comprising media files taking into account a playback profile associated with each of the media files.

The electronic commerce system 123 is executed in order to facilitate the online purchase of items over the network 109. The electronic commerce system 123 also performs various backend functions associated with the online presence of a merchant in order to facilitate the online purchase of items. For example, the electronic commerce system 123 generates network pages 173 such as web pages or other types of network content that are provided to clients 106 for the purposes of selecting items for purchase, rental, download, lease, or other form of consumption as will be described.

The other applications executed on the computing device 103 correspond to hosted applications that may access the data stored in the file system. Various other applications may, for example, have a web-based interface that may serve up network pages, such as web pages or other forms of network content, to facilitate user interaction. Other applications may include internal applications that may not have a web-based interface. For example, the other applications may include media organizing tools, media consuming tools, word processors, email applications, and/or other applications.

The data stored in the data store 113 includes, for example, account data 124, file systems 126, files 129, jukebox 133, and potentially other data. The account data 124 includes various data associated with file service accounts including data regarding authorized user(s) 125 of the computing device 103. In addition, account data 124 may also include usernames, passwords, security credentials, file management permissions, storage quotas and limitations, authorized applications, purchasing information, payment instrument information, billing information, and/or other data.

The file systems 126 correspond to logical file organizations that are maintained within the computing device 103 on behalf of one or more authorized users associated with a file service account. For instance, each file system 126 may represent a storage bucket in which various files 129 are stored. In various embodiments, the logical file organizations embodied in the file systems 126 are abstractions that do not directly correspond to any particular physical storage arrangements such as disk drives, portable storage media, etc. A file service account may be associated with one or more file systems 126. Each account-level user may have its own file system 126, or the file systems 126 may be shared by multiple account-level users.

Each file system 126 may include one or more files 129. A file 129 may include a file name 130, a unique identifier 136, a data object reference 139, a parent object reference 143, one or more permissions 146, a file creation date, a file modification date, and/or other data. The file name 130 may correspond to a human-readable character string that identifies the contents of the file 129. In one embodiment, the file name 130 may be limited in character length and may be limited in terms of allowed characters. In some cases, such limitations may be enforced for compatibility reasons. In addition, the file name 130 may be restricted to being unique to a folder and/or a file system 116 in various embodiments. In one embodiment, a file 129 may comprise a document and/or a media file, such as, for instance, an audio file (e.g. a song), a video file, and/or any other type of media file.

The unique identifier 136 corresponds to a number, character string, or other identifier that uniquely identifies the file 129 across the file system 126 and/or all of the file systems 126. In one embodiment, the unique identifier 136 of a file 129 coupled with an identifier of a file system 126 may correspond to an identifier that is unique across all of the file systems 126. In another embodiment, the unique identifier 136 of a file 129 may itself be unique across all of the file systems 126.

The data object reference 139 corresponds to a reference that may identify a data object associated with the file 129 that is stored in a data store such as the data store 113. In one embodiment, the data object reference 139 may include a key value for obtaining the data object. The data stored from which to obtain the data object may be determined implicitly or explicitly, for example, from a definition in the data object reference 139. The parent object reference 143 corresponds to a reference that may identify a folder or file 129 that is considered to be the parent of the file 129. In this way, the folders are associated with files 129. In some situations, the parent object reference 143 may include a special identifier, such as, for example, NULL and/or 0, that identifies the root of the file system 126.

The permissions 146 may correspond to access permissions and security policies associated with the file 129. For example, a user may be designated as a file owner, and a group of users may be designated as a file group. In such an example, read or write access may be enabled or disabled as it applies to the user, the group of users, and/or all users. Similarly, access to a file 129 may be enabled or disabled as it applies to a file service account, a group of file service accounts, and/or all file service accounts. In another embodiment, each file 129 may also have an associated metadata that describes the content of the file 129. For example, the metadata may comprise text that includes keywords describing the content and/or type of file 129. Finally, the playback profile 156 provides a playback description of the file 129 with respect to the user 125. For instance, the playback profile 156 may describe a playback frequency, a cumulative number of playbacks, a time of day the file 129 is commonly played back, and/or any other attribute that describes the playback of the file 129.

The jukebox 133 corresponds to information that is associated with providing a cloud jukebox experience, as will be described. For example, the jukebox 133 includes a jukebox playlist 149 that lists a plurality of jukebox media references 153. In one embodiment, each of the jukebox media references 153 may be a reference and/or a pointer to a file 129 of a file system 126. In addition, the jukebox 133 includes a disc jockey 163 that identifies a user 125 charged with managing the jukebox experience, as will be described. Finally, the disc jockey preferences 166 identify a plurality of preferences established by the disc jockey 163 for managing the jukebox playlist 149.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a client side application 169 and/or other applications. The client side application 169 may be executed in a client 106, for example, to access and render network pages, such as web pages, or other network content served up by the computing device 103 and/or other servers. To this end, the client side application 169 renders network pages 173 on the display 176. Network pages 173 indicating content (e.g. files 129) of a file system 126 can include media. In one embodiment, the client side application 169 is integrated with an operating system of the client 106 to provide access to the file system 126 similarly to a mounted file system of the client 106. The client 106 may be configured to execute applications beyond the client side application 169 such as, for example, email applications, instant message applications, and/or other applications.

Next, a general description of the operation of the various components of the networked environment 100 is provided. To begin, a user may desire to establish a cloud jukebox environment for transmitting media to a plurality of users, wherein the media being transmitted is stored in a plurality of file systems, each one being associated with a respective one of the users. For instance, a user may wish to invite a number of other users to a party, a social event, and/or any other type of gathering where the attendees can listen to music found on file systems associated with the other attendees. In one embodiment, a jukebox service 119 may identify media files 129 available from each attending user's file system 126 and generate a jukebox playlist 149 for transmitting the user media files 129. A disc jockey may then manage the jukebox 133 and the jukebox playlist 149 according to a plurality of disc jockey preferences 166, as will be described. In addition, the consuming users 125 may also participate in the management of the jukebox 133, as will be described.

In another embodiment, a media promoter may desire to micro-target an audience of users for promoting media. For instance, a music promoter may wish to micro-target an audience based on a characterization of the type of the music that the audience consumes and promote new music to that audience. As an example, the music promoter may wish to promote new music that is similar to, or of the same genre as, the music being consumed by the audience. Further, the media promoter may reward a user that consumes the promoted media with a credit that may be redeemable for purchasing and/or otherwise owning a plurality of other media files 129, as will be described.

To begin, a user may create a jukebox 133 via a jukebox service 119 for transmitting files 129 referenced by jukebox media references 153 over the network 109 to users 125 on a plurality of client devices 106 for consumption. For instance, the jukebox service 119 may transmit, stream, broadcast, and/or communicate the files 129 in any other way to the clients 106, as can be appreciated. The jukebox service 119 may build a listing of jukebox media references 153 that make up a jukebox playlist 149, and identify a disc jockey 163 for managing the jukebox 133. In addition, the jukebox service 119 may provide for a plurality of users 125 consuming the transmitted files 129 to participate in selecting a disc jockey 163, and determining an order for the jukebox playlist 149, as will be described.

On a first access, the jukebox service 119 prompts a user 125 to create the jukebox 133 by providing one or more parameters for establishing the jukebox 133. For instance, the jukebox service 119 may prompt the user 125 to indicate a name for the jukebox 133, a date and time for initiating the jukebox 133, a duration for which the jukebox 133 may transmit the files 129, a preference for determining a disc jockey 163 to manage the jukebox 133, and/or any other parameter for establishing the jukebox 133. In another embodiment, the jukebox service 119 may also prompt the user 125 to indicate a location for the jukebox 133. For instance, the jukebox service 119 may transmit files 129 to reach a predetermined radius with respect to the specified location.

In one embodiment, the jukebox service 119 may then invite a plurality of users 125 to consume the media that is transmitted from the jukebox 133, as will be described. In one embodiment, the jukebox service 119 may first verify that the users 125 accepting the invitations are located within the predetermined radius or distance of the specified location. For example, verification using a quick response code, a location based approach, a protected passphrase, and/or any other verification approach may be used as can be appreciated. As a further example, the jukebox service 119 may use a verification approach as described in U.S. patent application Ser. No. 13/217,324, which is incorporated herein by reference in its entirety. Further, upon accepting the invitation, the jukebox service 119 may then request access to one or more file systems 126 associated with each of the users 125 accepting the invitation. For instance, the jukebox service 119 may request access to the files 129 in the file system 126 of each of the users 125 accepting the invitation. Once the jukebox service 119 has been granted access to the files 129, the jukebox service 119 may then determine that the user 125 is in electronic communication with the jukebox service 119.

Next, the jukebox service 119 may then determine a disc jockey 163 to manage the jukebox 133 by selecting from one of the users 125 that is in electronic communication with the jukebox service 119. In one embodiment, as an initial setting, the jukebox service 119 may select the user 125 that created the jukebox 133 to serve as the disc jockey 163. In another embodiment, the user 125 creating the jukebox 133 may specify that the jukebox service 119 select another user 125 to serve as the disc jockey 163. For instance, the jukebox service 119 may select a user 125 in electronic communication with the jukebox service 119 to serve as the disc jockey 163 based on a variety of approaches. As an example, the jukebox service 119 may select the disc jockey 163 based on a vote by all of the users 125 in electronic communication with the jukebox service 119, a round robin style selection of one of the users 125, and/or any other approach for selecting a disc jockey 163 from one of the users 125. In another embodiment, the jukebox service 119 may not select any user 125 to serve as the disc jockey 163 and instead automate the functions of the disc jockey 163.

Having selected a disc jockey 163, the jukebox service 119 then prompts the disc jockey 163 to provide a plurality of disc jockey preferences 166 for identifying the jukebox media references 153 to files 129 that are to be transmitted with the jukebox service 119. In one embodiment, the jukebox service 119 identifies the jukebox media references 153 based on the files 129 in the file systems 126 associated with each one of the users 125 in electronic communication with the jukebox service 119. For example, the files 129 may be music files, video files, and/or any other type of media file. In one embodiment, the disc jockey 163 may be prompted to provide disc jockey preferences 166 for identifying a plurality of files 129 to include in the listing of jukebox media references 153. Using the example of transmitting music from above, the disc jockey preferences 166 may include a genre of music, one or more artist names, a popularity and/or a star rating of a song, an age range of a user 125 from whose file system 126 the jukebox service 119 may identify files 129, and/or any other type of disc jockey preference 166. In one embodiment, the user 125 creating the jukebox 133 may provide the preferences for identifying jukebox media references 153. For instance, in the embodiment where no disc jockey 163 is identified, the user 125 creating the jukebox 133 may provide the relevant preferences for identifying the jukebox media references 153.

In another embodiment, the jukebox service 119 may automatically determine the disc jockey preferences 166 based on a variety of factors. For instance, the jukebox service 119 may identify the jukebox media references 153 to the files 129 of the users 125 according to a sales velocity of a song, an album, and/or any other product by an artist. As another example, the jukebox service 119 may also identify the jukebox media references 153 based on one or more popularity rankings, critical reviews, and/or any other criteria as can be appreciated.

In one embodiment, the jukebox service 119 may also provide for the disc jockey 163 to preclude identifying files 129 from a file system 126 of users 125 that satisfy one or more disc jockey preferences 166. For instance, disc jockey 163 may indicate that any file systems 126 of users 125 outside of a specified age range should be excluded when identifying the files 129. Having received the disc jockey preferences 166, the jukebox service 119 may then identify the files 129 from the file systems 126 of each of the users 125 in electronic communication with the jukebox service 119. In one embodiment, the jukebox service 119 may identify the files 129 that correspond with the disc jockey preferences 166. For instance, the jukebox service 119 may examine a metadata associated with each of the files 129 to determine the content of the file 129. Then, the jukebox service 119 may identify a file 129 for consumption if the metadata describing the file 129 corresponds with one or more of the disc jockey preferences 166. In one embodiment, the jukebox service 119 may generate a listing of all files 129 that correspond with the disc jockey preferences 166 to create the jukebox media references 153. Additionally, according to another embodiment, the jukebox service 119 may identify files 129 for consumption based on a preferences list associated with each of the users 125, a consumption history associated with each of the users 125, and/or any other listing of songs associated with each of the users 125. For example, the jukebox service 119 may identify the files 129 from a list of media files indicated in a social media profile of the user 125.

Next, the jukebox service 119 may then generate a jukebox playlist 149 according to a playback profile 156 of each of the files 129 referenced by the jukebox media references 153. In one embodiment, the playback profile 156 may describe a frequency of playback of each of the files 129 referenced by the jukebox media references 153, a cumulative number of playbacks for each referenced file 129, a time of day each of the referenced files 129 is commonly played back, a cumulative number of times each referenced file 129 appears in a file system 126 associated with one of the users 125, a cumulative number of times each referenced file 129 is marked as a 'favorite' by each of the users 125, and/or any other factor that describes the playback of the files 129 referenced by the jukebox media references 153. In one embodiment, the jukebox service 119 may determine the playback profile 156 according to a statistical analysis of the files 129 referenced by the jukebox media references 153, as can be appreciated.

Having determined the playback profile 156, the jukebox service 119 generates the jukebox playlist 149 according to the playback profile 156 of each one of the files 129 referenced by the jukebox media references 153. In one embodiment, the jukebox service 119 may order the jukebox media references 153 such that the appearance of a jukebox media reference 153 in the ordered jukebox playlist 149 corresponds to the playback frequency of the referenced file 129, a cumulative number of times the referenced file 129 appears in the file systems 126 associated with the users 125, a cumulative number of times the referenced file 129 is marked as a 'favorite,' and/or any other attribute of the playback profile 156.

In another embodiment, the jukebox service 119 may generate the jukebox playlist 149 based upon a combination of the attributes comprising the playback profile 156. For example, the jukebox service 119 may order the jukebox media references 153 according to an average rating for each referenced file 129 given by the users 125 and a time of day each referenced file 129 is most frequently played back. Thus, the jukebox service 119 may generate a jukebox playlist 149 that includes highly rated songs according to the users 125 that are frequently played during a time period that the jukebox service 119 is scheduled to transmit the referenced files 129, such as, for example, a Friday evening between 9 PM and 11 PM.

In one embodiment, the jukebox service 119 may provide for the disc jockey 163 to adjust the jukebox playlist 149 as desired. For example, the disc jockey 163 may dislike a particular jukebox media reference 153 pointing to a referenced file 129. In this example, the jukebox service 119 may facilitate removal of the disliked jukebox media reference 153 from the jukebox playlist 149 by the disc jockey 163. Additionally, the jukebox service 119 may also provide for the disc jockey 163 to add new jukebox media references 153 to the jukebox playlist 149, re-order existing jukebox media references 153 in the jukebox playlist 149, and/or otherwise adjust the jukebox playlist 149 in any other manner.

In another embodiment, the jukebox service 119 may also provide for the disc jockey 163 to insert a placeholder into the jukebox playlist 149 for transmitting a file 129 referenced by a jukebox media reference 153 to be determined at a later time. The disc jockey 163 may then allow the users 125 consuming the transmitting media to vote and/or otherwise indicate a particular jukebox media reference 153 pointing to a file 129 to be transmitted at the placeholder position in the jukebox playlist 149. In one embodiment, the disc jockey 163 may provide one or more parameters for selecting the jukebox media reference 153 pointing to a file 129 that is transmitted at the placeholder position, such as, for example, a genre, an artist, and/or any other type of parameter.

In one embodiment, the jukebox service 119 may provide for the users 125 consuming the referenced files 129 being transmitted by the jukebox service 119 to participate in managing the jukebox playlist 149. For example, the jukebox service 119 may provide for the users 125 to vote on new jukebox media references 153 to be added to the jukebox playlist 149, to request a specific jukebox media reference 153 to be transmitted by the jukebox 133, to request an alternate disc jockey 163, and/or any other activity for managing the jukebox playlist 149.

Next, a media promoter may desire to micro-target audiences for promoting new media using the jukebox service 119. For instance, using the music example from above, a music promoter may micro-target a listening audience based on the characterization to promote new music. In one embodiment, the jukebox service 119 may determine a characterization of the files 129 consumed by a listening audience of users 125 based on the files 129 being transmitted by the jukebox service 119, as will be described. The jukebox service 119 may then identify new music to promote to the users 125 that aligns with the characterization. Then, the jukebox service 119 may include the new music as new jukebox media reference 153 in the jukebox playlist 149 pointing to new referenced files 129 scheduled for transmitting by the jukebox service 119. In addition, the jukebox service 119 may incentivize the users 125 for listening to the new music by crediting the users 125 with redeemable units for purchasing items through an electronic commerce system 123, such as, for instance, new media files 129 unlicensed with respect to the user 125, as will be described. Further, the jukebox service 119 may provide this functionality for the media promoter for a fee.

In one embodiment, the jukebox service 119 determines the characterization of the files 129 consumed by the users 125 based at least in part on the jukebox media references 153 comprising the jukebox playlist 149. For instance, the characterization of the files 129 may describe a genre of the files 129 being consumed by the users 125, an artist most commonly appearing in jukebox playlist 149, a general tempo of the files 129 being consumed, and/or any other characterization of the referenced files 129. As an example, the jukebox service 119 may determine a general tempo (beats/min) of the referenced files 129 from a metadata that may be associated with each of the referenced files 129. For instance, the metadata may include metrics describing the file 129 that may be analyzed to determine the tempo.

Additionally, in one embodiment, the jukebox service 119 may determine the characterization from the disc jockey preferences 166 used to identify the jukebox media references 153, as described above. In another embodiment, the jukebox service 119 may determine the characterization from the playback profile 156 used to generate the jukebox playlist 149, as described above. In yet another embodiment, the jukebox service 119 may determine the characterization of the files 129 based on a combination of the disc jockey preferences 166 and the playback profile 156.

Having determined the characterization of the files 129 consumed by the users 125, the jukebox service 119 may then identify promotional jukebox media references 153 for insertion into the jukebox playlist 149. In one embodiment, the jukebox service 119 identifies promotional jukebox media references 153 from the files 129 of a file system 126 associated with a media promoter. For instance, the media promoter may be a user 125 with a user account 124 having a file system 126 accessible by the jukebox service 119. In this embodiment, the jukebox service 119 may identify a promotional jukebox media reference 153 for insertion into the jukebox playlist 149 based on the characterization. For example, a promotional jukebox media reference 153 may be inserted into the jukebox playlist 149 if the file 129 referenced by the promotional jukebox media reference 153 aligns with the characterization.

In one embodiment, the jukebox service 119 may insert the promotional jukebox media references 153 at a random location in the jukebox playlist 149. In another embodiment, the jukebox service 119 may insert the promotional jukebox media references 153 at a placeholder location in the jukebox playlist 149. For example, a disc jockey 163 may insert placeholders within the jukebox playlist 149 for transmitting jukebox media files 129 to be determined at a later time, as described above. In this embodiment, the jukebox service 119 may insert the promotional jukebox media reference 153 at the placeholder location in the jukebox playlist 149.

Additionally, the jukebox service 119 may credit each of the users 125 with a redeemable credit for consuming the file 129 referenced by promotional jukebox media reference 153. In one embodiment, the redeemable credit may be monetary compensation provided by the media promoter that may be used by the users 125 for purchasing items through the electronic commerce system 123. For instance, the users 125 may purchase new files 129 that were previously unlicensed with respect to the users 125. As another example, the users 125 may purchase any other item available through the electronic commerce system 123 with the redeemable units.

In one embodiment, a user 125 may decline to consume the file 129 referenced by the promotional jukebox media reference 153. As such, the user 125 declining to consume the file 129 may not receive any redeemable credits. In another embodiment, a user 125 may request to consume a second promotional media file 129. For instance, the user 125 may transmit a request to consume a second promotional media file 129 substantially similar to the first promotional media file 129, such as, for instance, a second promotional song by the same artist performing the first promotional song. In this embodiment, the jukebox service 119 may transmit the second promotional media file 129 to the requesting user 125. Additionally, the jukebox service 119 may credit the user 125 with additional redeemable credit for consuming the second promotional media file 129.

Figure 2:
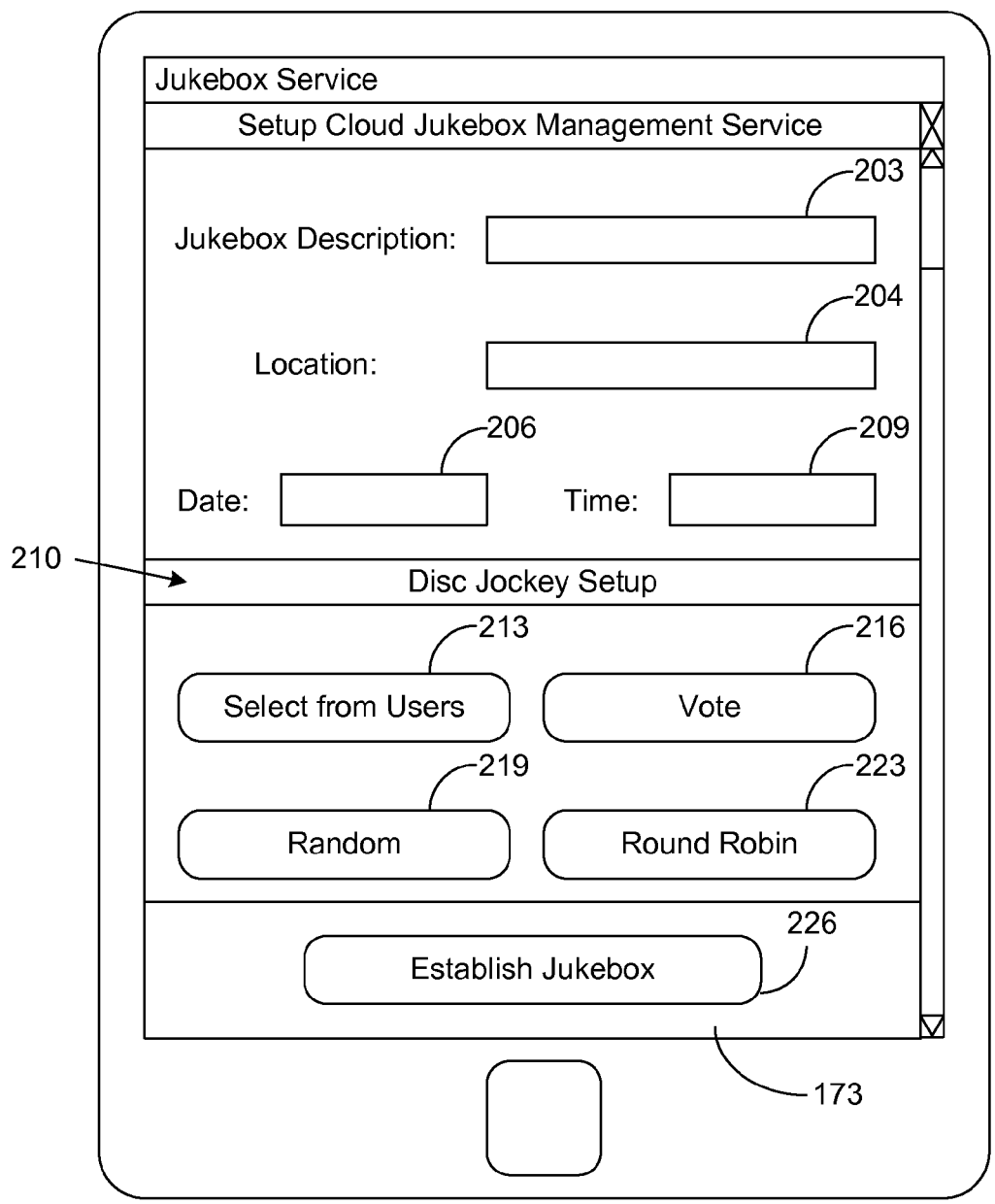
FIGS. 2-5 are drawings of an example of a user interface rendered by a client in the networked environment of FIG. 1 according to various embodiments of the present disclosure.

Referring next to FIG. 2, shown is one example of a network page 173, depicted herein as network page 173*a*, according to various embodiments of the present disclosure. The various graphical components such as blocks comprising information shown in FIG. 2 are merely examples of the various types of features that may be used to accomplish the specific function noted. The network page 173*a* is rendered on a display 176 (FIG. 1) associated with the client 106 (FIG. 1) according to various embodiments. In another embodiment, FIG. 2 may be viewed as depicting the display output of the client side application 169 (FIG. 1), according to various embodiments of the present disclosure.

In one embodiment, the jukebox service 119 (FIG. 1) generates the network page 173*a* to depict a homepage for a user 125 (FIG. 1) on the client 106 to establish a jukebox 133 (FIG. 1). As shown, the network page 173*a*, depicts a description field 203, a location field 204, a date field 206, a time field 209, a disc jockey setup area 210, and an establish button 226. In one embodiment, the user 125 creating the jukebox 133 may provide a description in the description field 203 such as, for instance, a name of the jukebox 133, a summary of the type of media being transmitted by the jukebox 133, a summary of the type of other users 125 being invited to consume the transmitting media, and/or any other description. Further, the user 125 may establish a location where the jukebox 133 may operate by indicating an address, a geographical area, and/or any other indicator for establishing a location. Additionally, the user 125 may indicate a date and time of the proposed jukebox 133 in the date field 206 and the time filed 209, respectively.

Next, in the disc jockey setup area 210, the user 125 may indicate a preferred approach for determining the disc jockey 163 (FIG. 1). As shown in this example, the network page 173*a* may include a select from users button 213, a vote button 216, a random button 219, and a round robin button 223. In one embodiment, the user 125 creating the jukebox 133 may toggle the select from users button 213 for selecting a disc jockey 163 from the users 125 consuming the transmitting media, the vote button 216 for selecting the disc jockey 163 from a vote amongst the users 125, the random button 219 for selecting the disc jockey 163 at random from the amongst the users 125, and the round robin button 223 for allowing each one of the users 125 a turn as the disc jockey 163 for a duration of time. Finally, toggling the establish button 226 may establish the jukebox 133, as described above.

Figure 3:
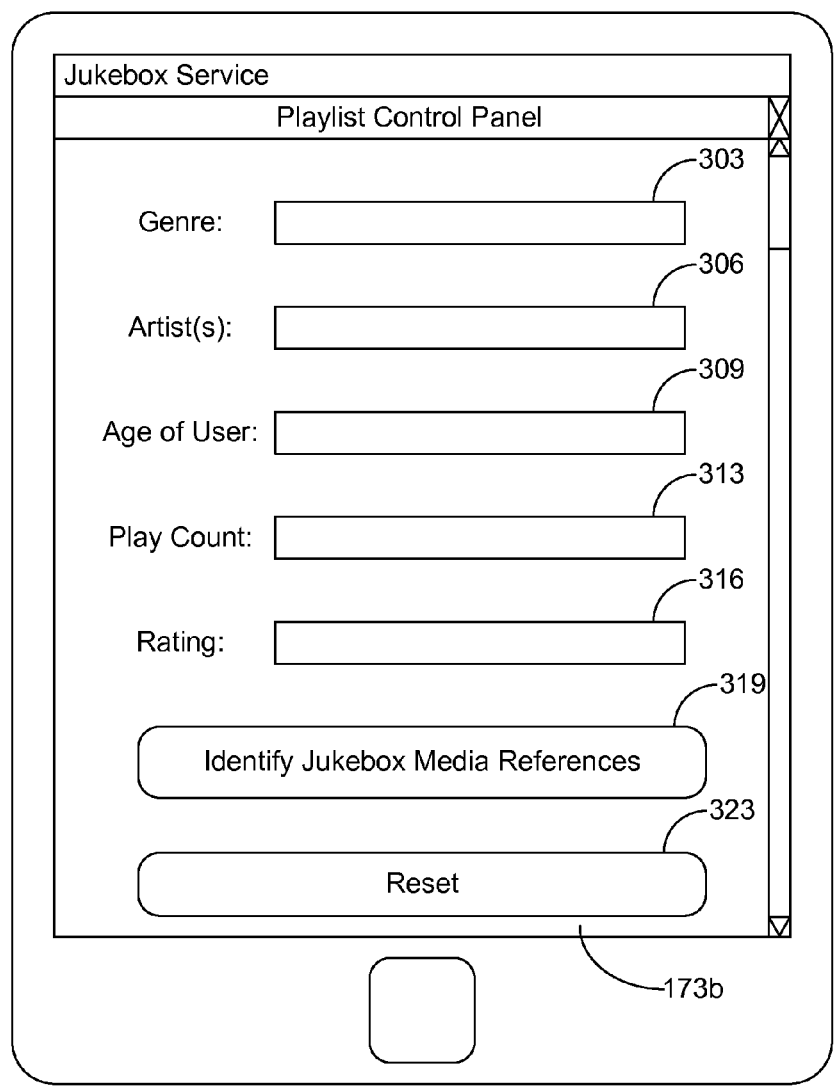

Turning now to FIG. 3, shown is one example of a network page 173, depicted herein as network page 173*b*, according to various embodiments of the present disclosure. The various graphical components such as blocks comprising information shown in FIG. 3 are merely examples of the various types of features that may be used to accomplish the specific function noted. The network page 173*b* is rendered on a display 176 (FIG. 1) associated with the client 106 (FIG. 1) according to various embodiments. In another embodiment, FIG. 3 may be viewed as depicting the display output of the client side application 169 (FIG. 1), according to various embodiments of the present disclosure.

In one embodiment, the jukebox service 119 generates the network page 173*b* to depict a homepage for a disc jockey 163 (FIG. 1) on the client 106 for providing a plurality of disc jockey preferences 166 (FIG. 1). As shown, the network page 173*b* may include a plurality of files for the disc jockey 163 to provide the disc jockey preferences 166, such as, for instance, a genre field 303, an artist field 306, an age field 309, a play count field 313, and a rating field 316. In addition, the network page 173*b* may also include an identify button 319, and a reset button 323.

According to one embodiment, the disc jockey 163 may provide disc jockey preferences 166 for identifying the jukebox media references 153 (FIG. 1), such as, for instance, a genre for a type of music in the genre field 303, one or more artists in the artist field 306, an average age of a user for selecting files 129 in the age field 309, a play frequency and/or a cumulative play count in the play count field 313, and a desired star rating in the rating field 316. In addition, other fields for providing other disc jockey preferences 166, as described above, may also be included in network page 173*b*. Further, toggling the identify button 319 may submit the disc jockey preferences 166 to the jukebox service 119 for identifying the jukebox media references 153 pointing to files 129 of the file systems 126 (FIG. 1). Additionally, toggling the reset button 323 may reset any of the fields of network page 173*b* to be clear of any input.

Figure 4:
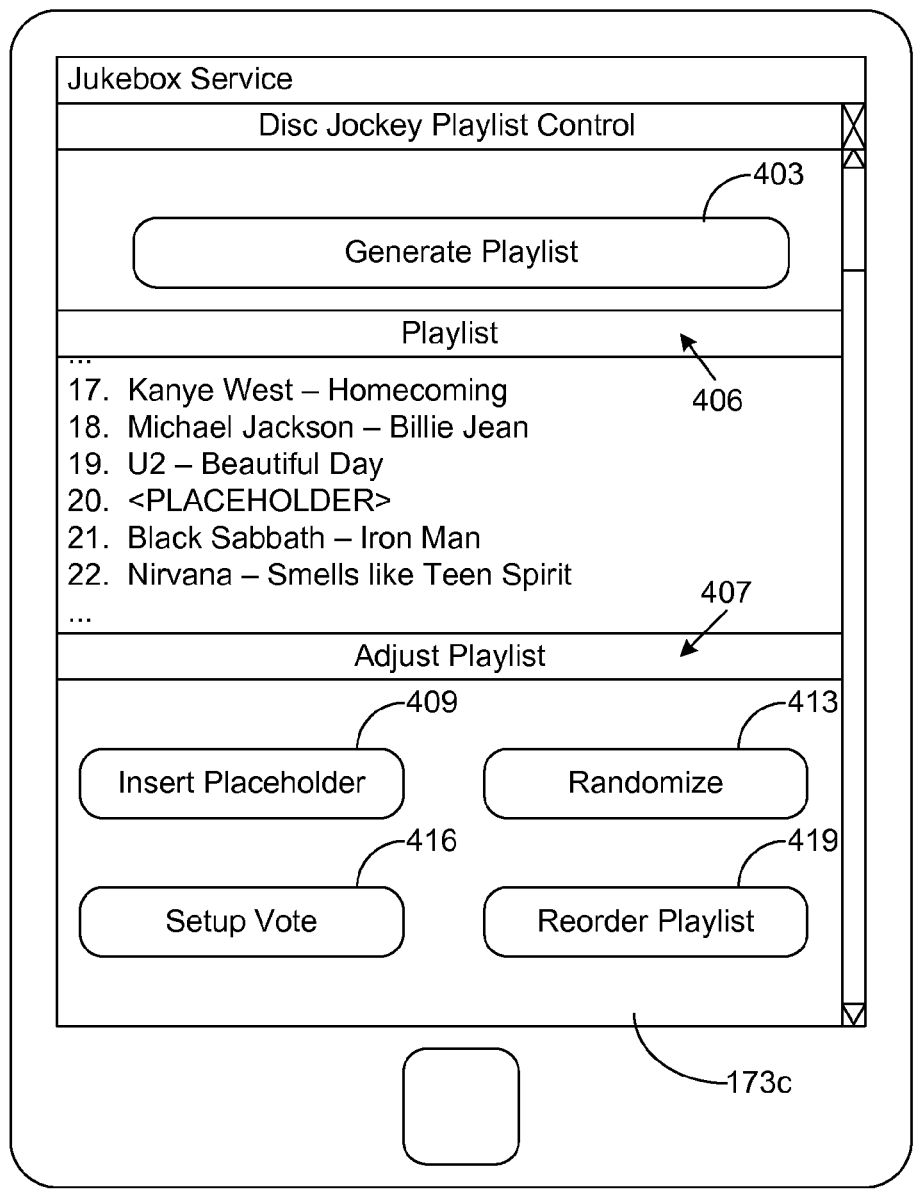

Moving on to FIG. 4, shown is one example of a network page 173, depicted herein as network page 173*c*, according to various embodiments of the present disclosure. The various graphical components such as blocks comprising information shown in FIG. 4 are merely examples of the various types of features that may be used to accomplish the specific function noted. The network page 173*c* is rendered on a display 176 (FIG. 1) associated with the client 106 (FIG. 1) according to various embodiments. In another embodiment, FIG. 4 may be viewed as depicting the display output of the client side application 169 (FIG. 1), according to various embodiments of the present disclosure.

In one embodiment, the jukebox service 119 (FIG. 1) generates the network page 173*c* to depict a playlist control page for a disc jockey 163 (FIG. 1) on the client 106 for managing a jukebox playlist 149 (FIG. 1). As shown, the network page 173*c* may include a generate playlist button 403, a playlist box 406, and a playlist control box 407. In one embodiment, the jukebox service 119 generates the jukebox playlist 149 when the disc jockey 163 toggles the generate playlist button 403. The generated jukebox playlist 149 may then appear in the playlist box 406, as shown in network page 173*c*.

In addition, the playlist control box 407 may include a plurality of control options for the disc jockey 163 to manage the jukebox playlist 149. For instance, the playlist control box 407 may include a placeholder button 409, a randomize button 413, a setup vote button 416, and reorder playlist button 419. In one embodiment, the jukebox service 119 may insert a placeholder in the jukebox playlist 149 at a desired location when the placeholder button 409 is toggled, and randomize the order of the jukebox media references 153 when the randomize button 413 is toggled. In addition, when the setup vote button 416 is toggled, the jukebox service 119 may setup a vote by the users 125 (FIG. 1) consuming the transmitting media for a jukebox playlist 149 management task, such as, for instance, inclusion of a new jukebox media reference 153, as described above. Finally, toggling the reorder playlist button 419 may provide for the disc jockey 163 for adjusting an order of the jukebox media references 153 in the jukebox playlist 149, as described above.

Figure 5:
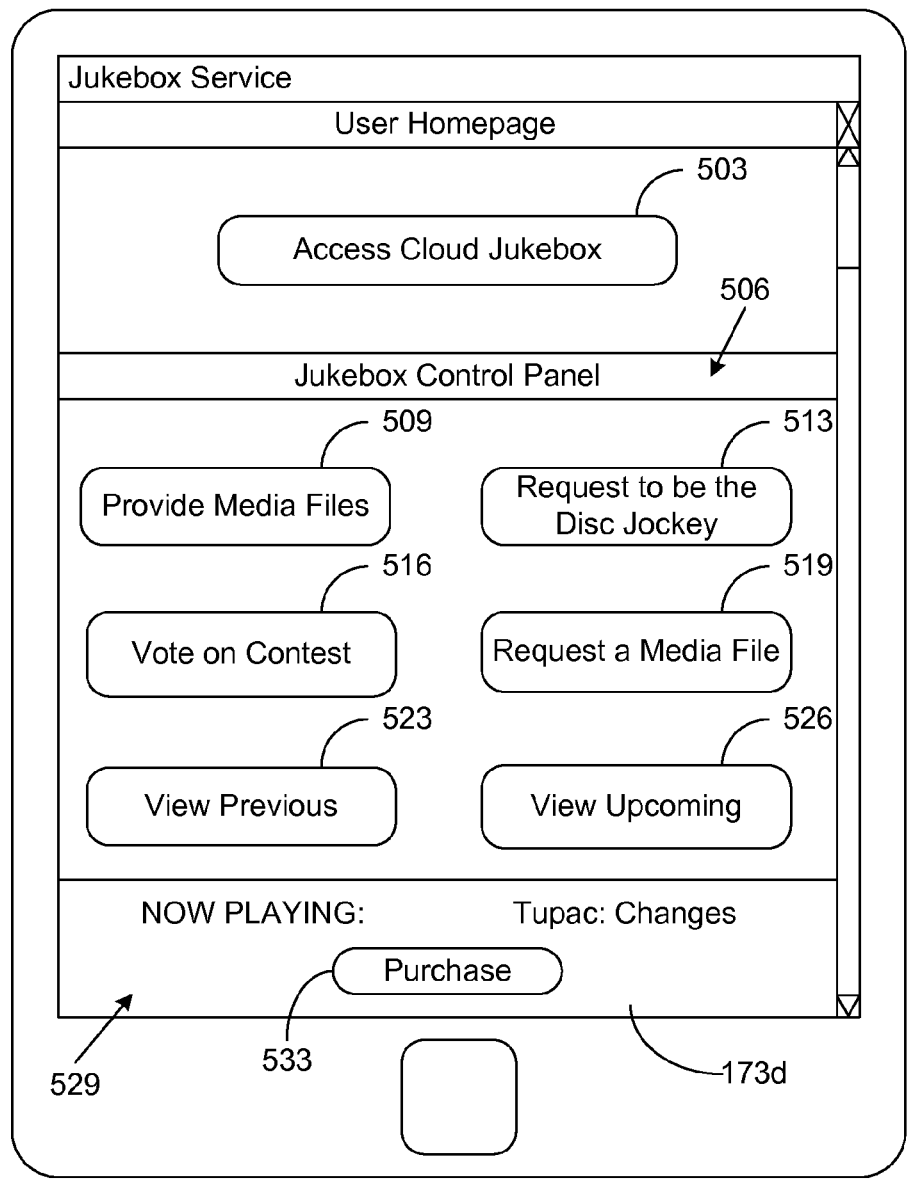

Referring now to FIG. 5, shown is one example of a network page 173, depicted herein as network page 173*d*, according to various embodiments of the present disclosure. The various graphical components such as blocks comprising information shown in FIG. 5 are merely examples of the various types of features that may be used to accomplish the specific function noted. The network page 173*d* is rendered on a display 176 (FIG. 1) associated with the client 106 (FIG. 1) according to various embodiments. In another embodiment, FIG. 5 may be viewed as depicting the display output of the client side application 169 (FIG. 1), according to various embodiments of the present disclosure.

In one embodiment, the jukebox service 119 (FIG. 1) generates the network page 173*d* to depict a homepage for a user 125 (FIG. 1) on the client 106 that is in electronic communication with the jukebox service 119. As shown, the network page 173*d* may include an access button 503, a jukebox control panel box 506, and a now playing box 529. In one embodiment, toggling the access button 503 may transmit a request to the jukebox service 119 to access the media being transmitted by the jukebox service 119, as described above.

Next, the jukebox control panel box 506 provides for the user 125 to participate in the transmitting of the files 129 referenced by the jukebox media references 153 (FIG. 1) by the jukebox service 119. As shown in network page 173*d*, the jukebox control panel box 506 includes a provide media files button 509, a request to be disc jockey button 513, a vote button 516, request media file button 519, view previous button 523, and a view next button 526. In one embodiment, toggling the provide media files button 509 provides access to the files 129 (FIG. 1) of a file system 126 (FIG. 1) associated with the user 125 to the jukebox service 119. Next, toggling the request to be disc jockey button 513 transmits a request to the jukebox service 119 for the user 125 to serve as the disc jockey 163 (FIG. 1).

Further, toggling the vote button 516 provides for the user 125 to vote on any contests being administered by the jukebox service 119. For example, the jukebox service 119 may allow all the users 125 consuming the transmitting media to vote on a next jukebox media reference 153 pointing to a file 129 to be transmitted, as described above. In addition, toggling the request media file button 519 provides for the user 125 to transmit a request to the jukebox service 119 to transmit a specific referenced file 129, as described above. Next, toggling the view previous button 523 and the view next button 526 may allow the user 125 to view a name of the referenced file 129 previously transmitted and the name of the referenced file 129 to be transmitted next, respectively. Finally, the now playing box 529 may depict the name of a referenced file 129 being currently transmitted by the jukebox service 119. In addition, a purchase button 533 included in the now playing box 529 may be toggled to transmit a request to the electronic commerce application 116 (FIG. 1) to initiate a purchase of the referenced file 129 being currently transmitted. For example, network pages 173 or other user interfaces may be presented to consummate the purchase as can be appreciated.

Referring next to FIG. 6, shown is a flowchart that provides one example of the operation of a portion of the jukebox service 119 according to various embodiments. It is understood that the flowchart of FIG. 6 provides merely an example of the many different types of functional arrangements that may be employed to implement the operation of the portion of the jukebox service 119 as described herein. As an alternative, the flowchart of FIG. 6 may be viewed as depicting an example of steps of a method implemented in the computing device 103 (FIG. 1) according to one or more embodiments.

In one embodiment, the jukebox service 119 identifies a plurality of jukebox media references 153 (FIG. 1) that point to files 129 (FIG. 1) of file systems 126 (FIG. 1) associated with a plurality of users 125 in electronic communication with the jukebox service 119 to include in a jukebox playlist 149 (FIG. 1). The jukebox service 119 then generates the jukebox playlist 149 according to a playback profile 156

(FIG. 1) of the files 129 being referenced by the jukebox media references 153 and transmits the referenced files 129 to the users 125.

Beginning with box 603, the jukebox service 119 identifies the jukebox media references 153 that are to be included in a jukebox playlist 149. In one embodiment, the jukebox service 119 identifies the jukebox media references 153 according to a plurality of disc jockey preferences 166 provided by the disc jockey 163. For example, the disc jockey preferences 166 may comprise a genre of music, a name of an artist, a star rating of a song, and/or any other preferences for identifying jukebox media references 153, as described above. The jukebox service 119 may then identify files 129 of a file system 126 associated with each of the users 125 that correspond with the disc jockey preferences 166 to reference in the jukebox media references 153, as described above.

Next, in box 606, the jukebox service 119 determines a playback profile 156 for the files 129 being referenced by the jukebox media references 153. In one embodiment, the playback profile 156 comprises a playback frequency, a cumulative number of playbacks, a most frequent time of playback, and/or any other attribute associated with the playback of the referenced files 129, as described above. The jukebox service 119 may determine the playback profile 156 based on a statistical analysis, as can be appreciated.

Then, in box 609, the jukebox service 119 generates the jukebox playlist 149 according to the playback profile 156. In one embodiment, the jukebox service 119 may generate the jukebox playlist 149 such that the order of the jukebox media references 153 corresponds with the playback profile 156 of each one of the referenced files 129. For instance, the jukebox service 119 may transmit referenced files 129 having a higher degree of playback frequency more frequently than referenced files 129 having a lesser degree of playback frequency, as described above. In addition, the jukebox service 119 may allow the users 125 consuming the transmitting referenced files 129 to provide input on an order for the jukebox playlist 149, as described above.

Referring next to FIG. 7, shown is a flowchart that provides one example of the operation of a portion of the jukebox service 119 according to various embodiments. It is understood that the flowchart of FIG. 7 provides merely an example of the many different types of functional arrangements that may be employed to implement the operation of the portion of the jukebox service 119 as described herein. As an alternative, the flowchart of FIG. 7 may be viewed as depicting an example of steps of a method implemented in the computing device 103 (FIG. 1) according to one or more embodiments.

In one embodiment, the jukebox service 119 provides for a media promoter to micro-target an audience based on a characterization of the files 129 consumed by the audience. For example, the jukebox service 119 determines the characterization of the files 129 consumed by the users and identifies promotional media files that align with the characterization. The jukebox service 119 may then provide for the media promoter to adjust the transmitting media to include the identified promotional media files for consumption by the users.

Beginning with box 703, the jukebox service 119 determines a characterization of the files 129 (FIG. 1) referenced by the jukebox media referenced 153 (FIG. 1) being transmitted by the jukebox service 119. In one embodiment, the characterization may comprise an artist most commonly appearing in the jukebox playlist 149 (FIG. 1), a general tempo of the referenced files 129, and/or any other characterization of the files 129 being referenced by the jukebox media references 153. Additionally, in one embodiment, the characterization may be substantially similar to the disc jockey preferences 166 (FIG. 1) provided by the disc jockey 163 (FIG. 1) and the playback profile 156 (FIG. 1) used to generate the jukebox playlist 149 (FIG. 1).

Next, in box 706, the jukebox service 119 identifies promotional files 129 that align with the characterization. In one embodiment, the promotional files 129 may be identified from a file system 126 associated with the media promoter. The jukebox service 119 may select one or more of the promotional files 129 that correspond with at least one attribute of the characterization to include as a jukebox media reference 153 in the jukebox playlist 149, as described above.

Finally, in box 709, the jukebox service 119 adjusts the jukebox playlist 149 to include the promotional jukebox media references 153 that point to the promotional files 129 identified in box 706. In one embodiment, the jukebox service 119 may insert the promotional jukebox media references 153 at a random location in the jukebox playlist 149, and/or at a previously established placeholder in the jukebox playlist 149, as described above.

Figure 8:
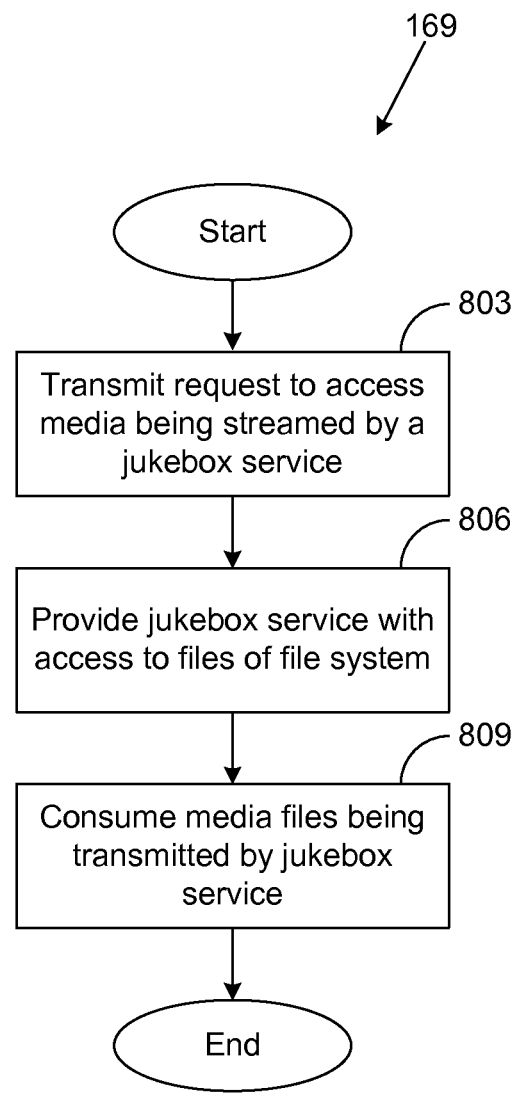
FIG. 8 is a flowchart illustrating one example of functionality implemented as portions of a client side application executed in a client device in the networked environment of FIG. 1 according to various embodiments of the present disclosure.

Referring next to FIG. 8, shown is a flowchart that provides one example of the operation of a portion of the client side application 169 according to various embodiments. It is understood that the flowchart of FIG. 8 provides merely an example of the many different types of functional arrangements that may be employed to implement the operation of the portion of the client side application 169 as described herein. As an alternative, the flowchart of FIG. 8 may be viewed as depicting an example of steps of a method implemented in the client 106 (FIG. 1) according to one or more embodiments.

In one embodiment, the client side application 169 communicates with the jukebox service 119 (FIG. 1) of a computing device 103 (FIG. 1) to receive a plurality of referenced files 129 (FIG. 1) being transmitted by the jukebox service 119. Upon requesting access to the transmitting media, the client side application 169 then provides the jukebox service 119 with access to the files 129 (FIG. 1) of a file system 126 (FIG. 1) associated with the user 125 (FIG. 1) on the client 106. In response, the client side application 169 then receives the transmitting media for consumption by the user 125.

Beginning with box 803, the client side application 169 transmits a request to the jukebox service 119 for access to the referenced files 129 being transmitted by the jukebox service 119. In one embodiment, the jukebox service 119 may verify that the request is being received from a client 106 located within a radius of a previously determined location. For example, the jukebox service 119 may verify the location of the client 106 using a quick response code, a passphrase, a geographic location, and/or any other approach, as described above.

Next, in box 806, the client side application 169 provides the jukebox service 119 with access to the files 129 of the file system 126 associated with the user 125. In one embodiment, the client side application 169 may be required to provide this access to the files 129 in order to receive the transmitting media. Finally, in box 809, the client side application 169 receives the files 129 being transmitted by the jukebox service 119 in response to the access to the files 129.

Figure 9:
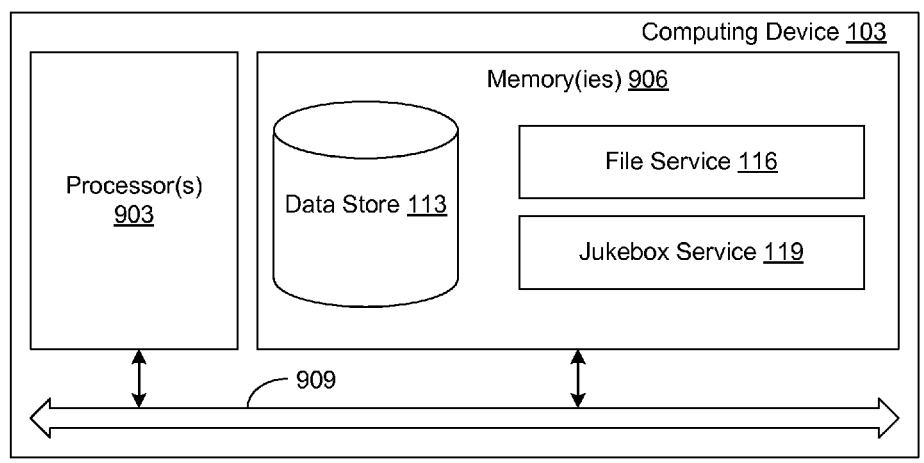
FIG. 9 is a schematic block diagram that provides one example illustration of a computing device employed in the networked environment of FIG. 1 according to various embodiments of the present disclosure.

With reference to FIG. 9, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are a file service 116, a jukebox service 119, and potentially other applications. Also stored in the memory 906 may be a data store 113 and other data. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 109 (FIG. 1) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the file service 116 and the jukebox service 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6, 7, and 8 show the functionality and operation of an implementation of portions of the jukebox service 119 and the client side application 169, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 6-8 show a specific order of execution, it is understood that the order of execution may differ from that which is depicted. For example, the order of execution of two or more blocks may be scrambled relative to the order shown. Also, two or more blocks shown in succession in FIGS. 6-8 may be executed concurrently or with partial concurrence. Further, in some embodiments, one or more of the blocks shown in FIGS. 6-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 116 and the jukebox service 119, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising machine readable instructions that, when executed by a processor of the computing device, cause the computing device to at least:
   receive a request from a plurality of users on a plurality of clients to consume a plurality of media files;
   access a plurality of files of a file system associated with each one of the users;
   identify the plurality of media files from the files, wherein the media files correspond with a plurality of preferences provided by one of the users;
   generate a playlist that includes a plurality of media references, wherein each of the media references points to a respective one of the identified media files and the playlist being generated by at least:
      excluding a first subset of the identified media files from inclusion in the playlist based at least in part on the plurality of preferences and
      selecting a second subset of the identified media files based at least in part on the plurality of preferences;
   determine a playback profile of each one of the media files, wherein the playback profile describes a frequency of playback of the respective media file; and
   determine an order for the media references in the playlist based at least in part on the playback profile of each of the files being pointed to by the media references.

2. The non-transitory computer-readable medium of claim 1, wherein the application further comprises machine readable instructions stored in the memory that, when executed by the processor, cause the computing device to at least:
   provide for the users to participate in managing the playlist by adjusting the order of the media references; and
   provide the preferences to identify the media files.

3. The non-transitory computer-readable medium of claim 1, wherein the preferences comprise at least one of a genre of music, an artist, or an age of at least one of the users.

4. A system, comprising:
   a computing device comprising a processor and a memory; and
   an application executable in the computing device, the application comprising machine readable instructions stored in the memory that, when executed by the processor, cause the computing device to at least:
      identify a plurality of files within a plurality of file systems associated with a plurality of users, wherein the files correspond with a plurality of preferences stored in a memory accessible by the computing device and the file systems are associated with a respective one of the users;
      include a plurality of media references pointing to the identified files in a playlist, wherein the playlist is managed by a designated user;
      determine a playback profile for each one of the identified files based on a plurality of attributes associated with each one of the identified files; and
      generate the playlist based at least in part on the playback profile of each one of the identified files by at least:
         excluding a first subset of the identified files from the playlist based at least in part on the plurality of preferences; and
         selecting a second subset of the identified files to include in the playlist based at least in part on the plurality of preferences.

5. The system of claim 4, wherein the preferences comprise a type of genre, a name of an artist, a star rating of a file, a popularity of the file, or an age of at least one of the users.

6. The system of claim 4, wherein the playback profile comprises a playback frequency, a cumulative number of playbacks, and a most frequent time of playback.

7. The system of claim 4, wherein the playlist is further generated according to a vote by the users.

8. The system of claim 4, wherein the application further comprises machine readable instructions that cause the computing device to at least provide for the designated user to adjust the playlist.

9. The system of claim 8, wherein the application further comprises machine readable instructions that cause the computing device to at least provide for the designated user to insert a placeholder for a media file to be determined at a later time, wherein the media file is selected to replace the placeholder based on a plurality of placeholder preferences.

10. The system of claim 4, wherein the application further comprises machine readable instructions that cause the computing device to at least send the identified files to the users located within a specified distance of a specified location.

11. The system of claim 10, wherein the application further comprises machine readable instructions that cause the computing device to at least determine whether one of the users is located within the specified distance of the specified location based on at least one of a quick response code, a geographic location identifier, and a passphrase.

12. The system of claim 4, wherein the application further comprises machine readable instructions that cause the computing device to at least select the designated user from the users.

13. The system of claim 12, wherein the designated user is identified according to at least one of a previously determined user, a vote by the users, or a round robin selection.

14. The system of claim 4, wherein the application further comprises machine readable instructions that cause the computing device to at least identify a plurality of additional files from at least one of a preferences list and a consumption list.

15. A method, comprising:
- identifying a plurality of files within a plurality of file systems associated with a plurality of users of the media consumption service, wherein the files correspond with a plurality of preferences stored in a memory accessible by the computing device and the file systems are associated with a respective one of the users;
- including a plurality of media references pointing to the identified files in a playlist, wherein the playlist is managed by a designated user;
- determining a playback profile for each one of the identified files based on a plurality of attributes associated with each one of the identified files; and
- generating the playlist based at least in part on the playback profile of each one of the identified files by at least:
  - excluding a first subset of the identified files from the playlist based at least in part on the plurality of preferences; and
  - selecting a second subset of the identified files to include in the playlist based at least in part on the plurality of preferences.

16. The method of claim 15, wherein the preferences comprise a type of genre, a name of an artist, a star rating of a file, a popularity of the file, or an age of at least one of the users.

17. The method of claim 15, wherein the playback profile comprises a playback frequency, a cumulative number of playbacks, or a most frequent time of playback.

18. The method of claim 15, wherein generating the playlist is further based at least in part on a vote by the users.

19. The method of claim 15, further comprising providing for the designated user to adjust the playlist.

20. The method of claim 19, further comprising providing for the designated user to insert a placeholder for a media file to be determined at a later time, wherein the media file is selected to replace the placeholder based on a plurality of placeholder preferences.

21. The method of claim 15, further comprising sending the identified files to the users located within a specified distance of a specified location.

22. The method of claim 21, further comprising determining that one of the users is located within the specified distance of the specified location based on at least one of a quick response code, a geographic location identifier, or a passphrase.

23. The method of claim 15, further comprising selecting the designated user from the users.

24. The method of claim 23, further comprising identifying the designated user according to at least one of a previously determined user, a vote by the users, or a round robin selection.

25. The method of claim 15, further comprising identifying a plurality of additional files from at least one of a preferences list and a consumption list.

* * * * *